(12) United States Patent
Li et al.

(10) Patent No.: US 12,657,288 B2
(45) Date of Patent: Jun. 16, 2026

(54) PROTECTION OF CALL STACK

(71) Applicant: International Business Machines Corporation, Armonk, NY (US)

(72) Inventors: Naijie Li, Haidian Dist (CN); Jing Lu, Beijing (CN); Ming Ran Liu, Beijing (CN); Xiao Yan Tang, Beijing (CN); Yuan Zhai, Beijing (CN); Guang Han Sui, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 798 days.

(21) Appl. No.: 17/550,516

(22) Filed: Dec. 14, 2021

(65) Prior Publication Data

US 2023/0185903 A1     Jun. 15, 2023

(51) Int. Cl.
*G06F 21/54* (2013.01)

(52) U.S. Cl.
CPC ........ *G06F 21/54* (2013.01); *G06F 2221/033* (2013.01)

(58) Field of Classification Search
CPC .......................... G06F 2221/033; G06F 21/54
See application file for complete search history.

(56) References Cited

U.S. PATENT DOCUMENTS

| | | | |
|---|---|---|---|
| 7,581,089 B1 | 8/2009 | White | |
| 7,603,704 B2 | 10/2009 | Bruening et al. | |
| 9,037,872 B2 | 5/2015 | Kaplan | |
| 9,251,373 B2 | 2/2016 | AlHarbi et al. | |
| 9,495,237 B1 | 11/2016 | Gschwind et al. | |
| 11,372,969 B1 * | 6/2022 | Sundahl | G06F 21/577 |
| 2012/0054582 A1 * | 3/2012 | Byom | G11C 16/26 |
| | | | 714/E11.034 |
| 2012/0278635 A1 * | 11/2012 | Hars | H04L 9/0637 |
| | | | 713/193 |
| 2016/0098556 A1 | 4/2016 | Alharbi et al. | |
| 2020/0042180 A1 * | 2/2020 | Byun | G06F 3/064 |
| 2021/0240638 A1 * | 8/2021 | Deutsch | G06F 12/1408 |
| 2022/0100418 A1 * | 3/2022 | Benisty | G06F 3/0656 |
| 2024/0143206 A1 * | 5/2024 | Arbel | G06F 3/0679 |

OTHER PUBLICATIONS

Zhao et al., "MPTEE: Bringing Flexible and Efficient Memory Protection to Intel SGX," EuroSys '20, Apr. 27-30, 2020, Heraklion, Greece, 15 pages, https://doi.org/10.1145/3342195.3387536.

Jin et al., "BoundShield: Comprehensive Mitigation for Memory Disclosure Attacks via Secret Region Isolation," IEEE Access, May 14, 2018, 13 pages, doi. 10.1109/ACCESS.2018.2835838.

Younan et al., "Extended protection against stack smashing attacks without performance loss," Research Gate, Dec. 2006, 11 pages, https://www.researchgate.net/publication/221046682.

Miller Matt, "Trends, challenges and strategic shifts in the software vulnerability mitigation landscape", BlueHat IL, Feb. 7, 2019, 32 pages.

* cited by examiner

*Primary Examiner* — Catherine Thiaw
*Assistant Examiner* — Daniel Elahian
(74) *Attorney, Agent, or Firm* — Daniel M. Yeates

(57) ABSTRACT

A first memory page in a memory of the computer is allocated as a first stack to buffer meta data for function calls in the program. A memory protection key for the first memory page is generated. A second memory page in the memory is allocated as a second stack to buffer user data for function calls in the program.

19 Claims, 6 Drawing Sheets

Figure 4:
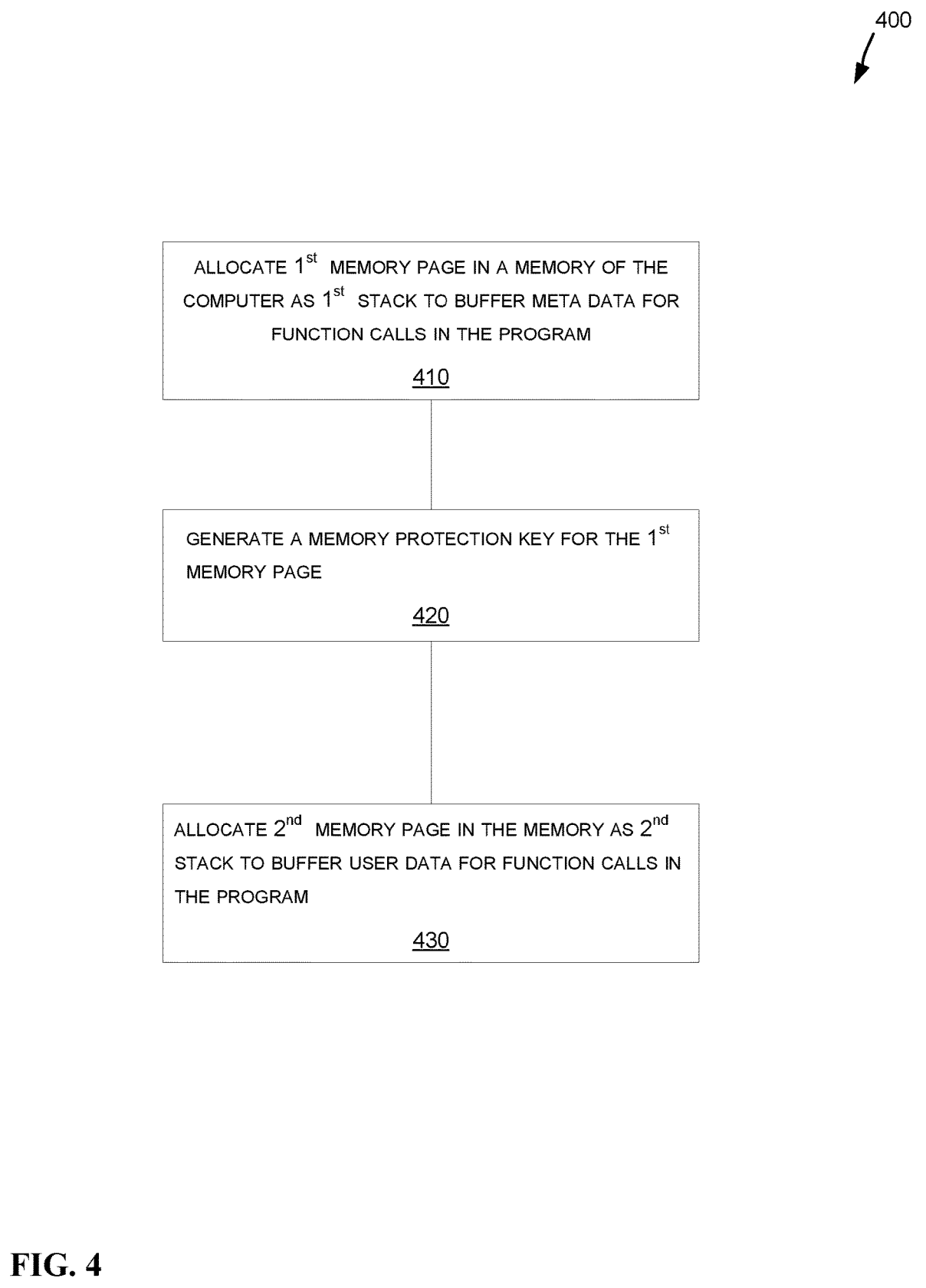

400

ALLOCATE 1$^{st}$ MEMORY PAGE IN A MEMORY OF THE
COMPUTER AS 1$^{st}$ STACK TO BUFFER META DATA FOR
FUNCTION CALLS IN THE PROGRAM

410

GENERATE A MEMORY PROTECTION KEY FOR THE 1$^{st}$
MEMORY PAGE

420

ALLOCATE 2$^{nd}$ MEMORY PAGE IN THE MEMORY AS 2$^{nd}$
STACK TO BUFFER USER DATA FOR FUNCTION CALLS IN
THE PROGRAM

PROTECTION OF CALL STACK

BACKGROUND

The present disclosure generally relates to memory security, and more specifically, to protection of call stack.

Memory buffer overflow attack is a common threat to computer systems and especially to memory security. Buffer overflow attacks take advantage of the memory buffer configuration that both user data and meta data of an invoked function are stored in the same stack frame. If a function is invoked by a caller function in a program, the callee function may write over-sized data in user data segments of a stack frame. The writing of over-sized data will cause buffer overflow, overwriting meta data segments of the same stack frame. The meta data segments contain critical data, such as return address in the caller function. If the return address is overwritten by an address of a malicious application, the malicious application will take control of program flow.

SUMMARY

According to embodiments, disclosed are a method, system, and computer program product.

According to one embodiment of the present disclosure, there is provided a method for executing a program in a computer, comprising: allocating a first memory page in a memory of the computer as a first stack to buffer meta data for function calls in the program; generating a memory protection key for the first memory page; and allocating a second memory page in the memory as a second stack to buffer user data for function calls in the program.

According to another embodiment of the present disclosure, there is provided a system comprising one or more processors and one or more computer-readable storage media storing program instructions. The program instructions, when executed by the one or more processors, are configured to cause the one or more processors to perform the following operation: allocating a first memory page in a memory of the computer as a first stack to buffer meta data for function calls in the program; generating a memory protection key for the first memory page; and allocating a second memory page in the memory as a second stack to buffer user data for function calls in the program.

According to yet another embodiment of the present disclosure, there is provided a computer program product comprising a computer readable storage medium having program instructions embodied therewith. The program instructions are executable by processing means, so as to cause the processing means to perform the following operation: allocating a first memory page in a memory of the computer as a first stack to buffer meta data for function calls in the program; generating a memory protection key for the first memory page; and allocating a second memory page in the memory as a second stack to buffer user data for function calls in the program.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

FIG. 4 depicts an overall process flow of a method 400 for executing a program in a computer according to embodiments of the present disclosure.

Figure 1:
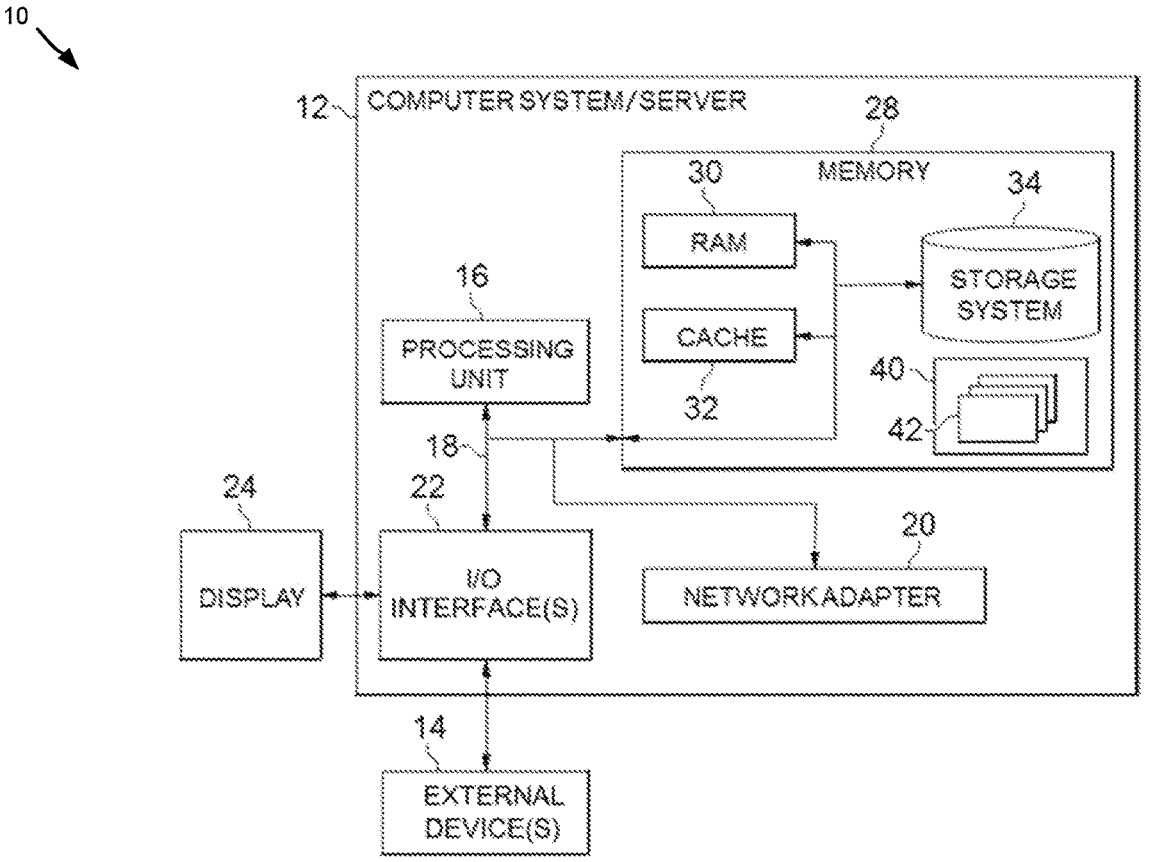
FIG. 1 shows an exemplary computer system which is applicable to implement the embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

Referring now to FIG. 1, an information handling system 10 comprises an exemplary computer system/server 12 which can be applicable to implement the embodiments of the present disclosure, a display 24 and an external device 14. FIG. 1 is also adapted to depict an illustrative example of a portable electronic device such as a communication device which is applicable to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable, non-removable, volatile, and/or non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

As mentioned in the background part, buffer overflow attacks are possible where function call stacks are configured that both user data and meta data of functions are stored in the same stack frames. If a function is invoked by a caller function in a program, the callee function may write over-sized data in user data segments of a stack frame. The writing of over-sized data will cause buffer overflow, overwriting meta data segments of the same stack frame. The meta data segments contain critical data, such as return address in the caller function. If the return address is replaced by an address pointing to an unexpected application, the application will take control of program flow upon completion of the execution of the callee function. This may be illustrated in FIG. 2 and FIG. 3.

Figure 2:
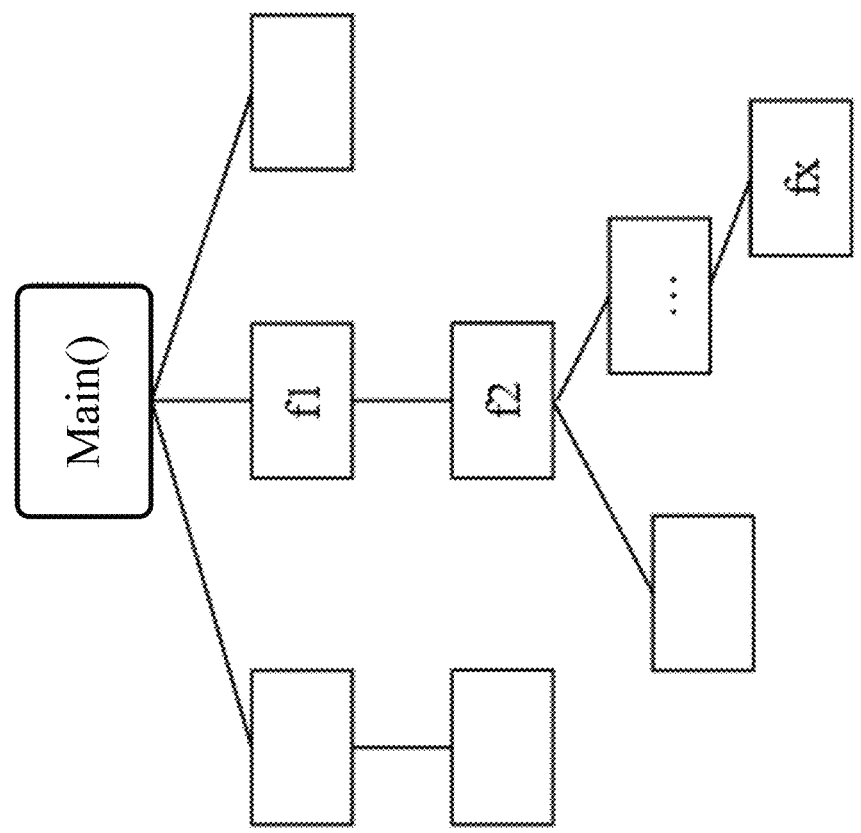
FIG. 2 depicts a function call structure of a program.

FIG. 2 depicts a function call structure of a program. Specifically, FIG. 2 depicts a function call structure of a program Main( ). The program Main( ) may be a program module 42 as shown in FIG. 1. As shown, in a calling path, the program Main( ) may first make a call to a function ƒ1. The function ƒ1 in turn makes a call to a function ƒ2. The calling function (a.k.a. caller) ƒ1 is the parent of the function ƒ2. The called function (a.k.a. callee) ƒ2 is a child of the function ƒ1. As shown, the function ƒ2 may call other functions. The last function called is a function ƒx.

Figure 3:
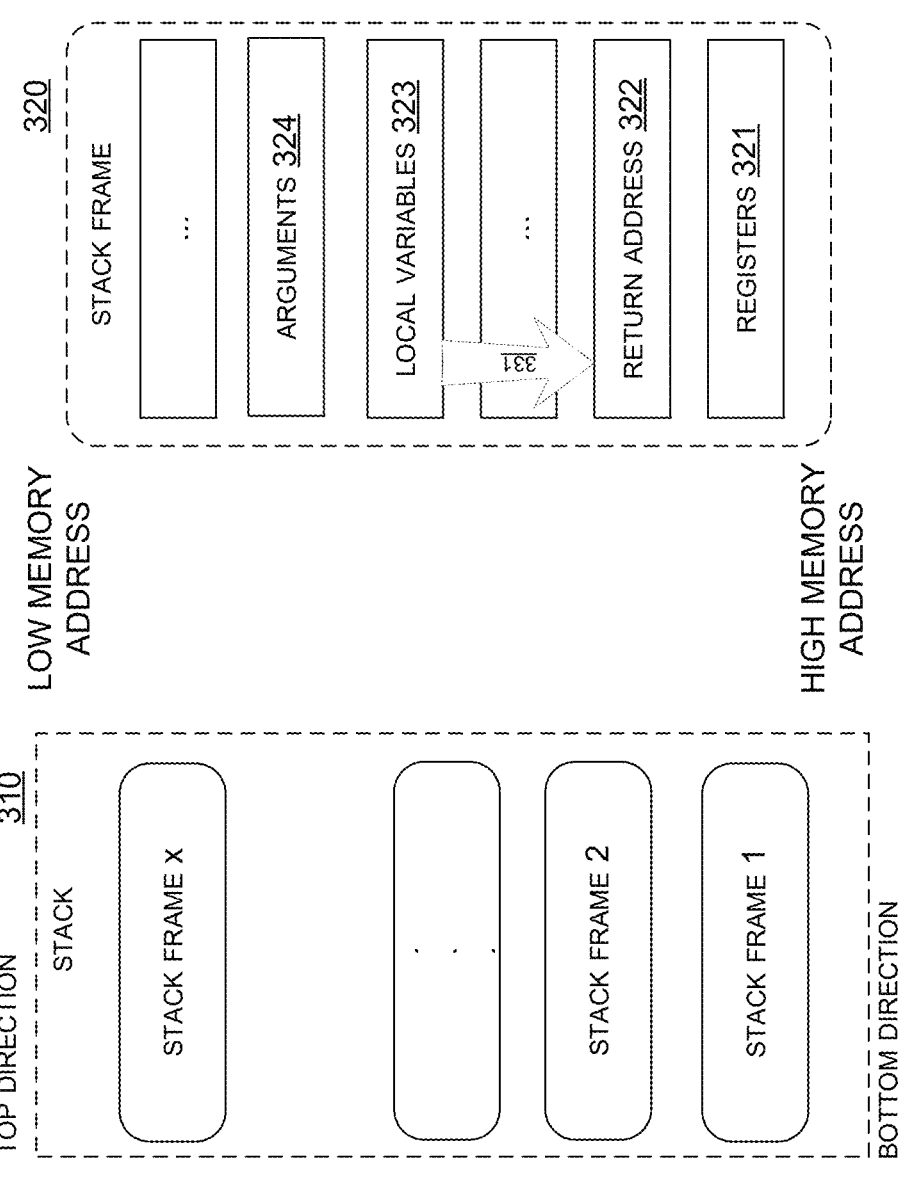
FIG. 3 depicts a call stack configuration for function calls.

FIG. 3 depicts a call stack 310. Call stack 310 is shown in FIG. 3 having stack frames 1, 2, . . . , and x in a computer memory. The stack 310 is a First-In Last Out (FILO) stack and grows from bottom direction to top direction.

The stack 310 is allocated by an operating system (OS) for the program Main( ), Stack frames 1, 2, . . . , and x represent the stack frames allocated to the functions ƒ1, ƒ2, . . . , and ƒx as they are called in turn by their respective parents.

FIG. 3 also shows a structure of a stack frame 320 representing any of Stack frames 1, 2, . . . , and x. Stack frame 320 comprises a meta data section and a user data section. The meta data comprises a registers segment 321 and a return address segment 322, among other things. The user data comprises a local variables segment 323 and an arguments segment 324, among other things. As is known in the art, the size of each segment may be determined by a compiler in compiling the program main( ).

For ease of description and understanding, suppose that, at certain time in the execution of the program Main( ), the function ƒ1 makes a call to the function ƒ2. In response, the stack frame 2 is created for the function ƒ2. Before the function ƒ2 is executed, a function prologue of the function ƒ2 will save meta data for ƒ2. As is known, function prologues (a.k.a. entry logic), as well as function epilogues (a.k.a. exit logic), are executable codes generated by the compiler for controlling respective function calls. For example, contents of registers of parent function ƒ1 will be stored in the registers segment 321 and a return address will be stored in the return address segment 322. The contents of registers include information of the context of the function ƒ1 at the time of calling the function ƒ2, and the return address points to a position in the codes of the function ƒ1 at which execution of the function ƒ1 will be restored upon completion of the execution of the function ƒ2.

During the execution of the function ƒ2, user data may be stored in other segments in the stack frame 2. The user data include intermediate data and arguments, among other things. The intermediate data may be stored in the local variables segment 323 and the arguments may be stored in the arguments segment 324. As is known, the arguments segment are parameter data passed between the function ƒ1 and the function ƒ2, including input to the function ƒ2 from the function ƒ1 and output of the function ƒ2 to the function ƒ1.

The intermediate data is subject to changes during the execution of the function ƒ2. For example, the intermediate data may include a local variable 323 assigned with a numeric value calculated in the execution of the function ƒ2. The intermediate data may include another local variable 323 assigned with a string value inputted in real time. If a piece of data corresponding to a local variable 323 is generated and the size of the data exceeds its pre-defined size, the writing of the over-sized data may cause local variables segment 323 to grow from low memory address to high memory address, causing buffer overflow. As shown by a dotted arrow 331, the overflow will lead to overwriting meta data, such as retain address 322 and registers 321. If the over-sized data is maliciously designed so that the return address 322 is overwritten by an address pointing to a malicious program, then the function ƒ2, upon its completion, will return to the address and the malicious program will take control of program flow.

Figure 5:
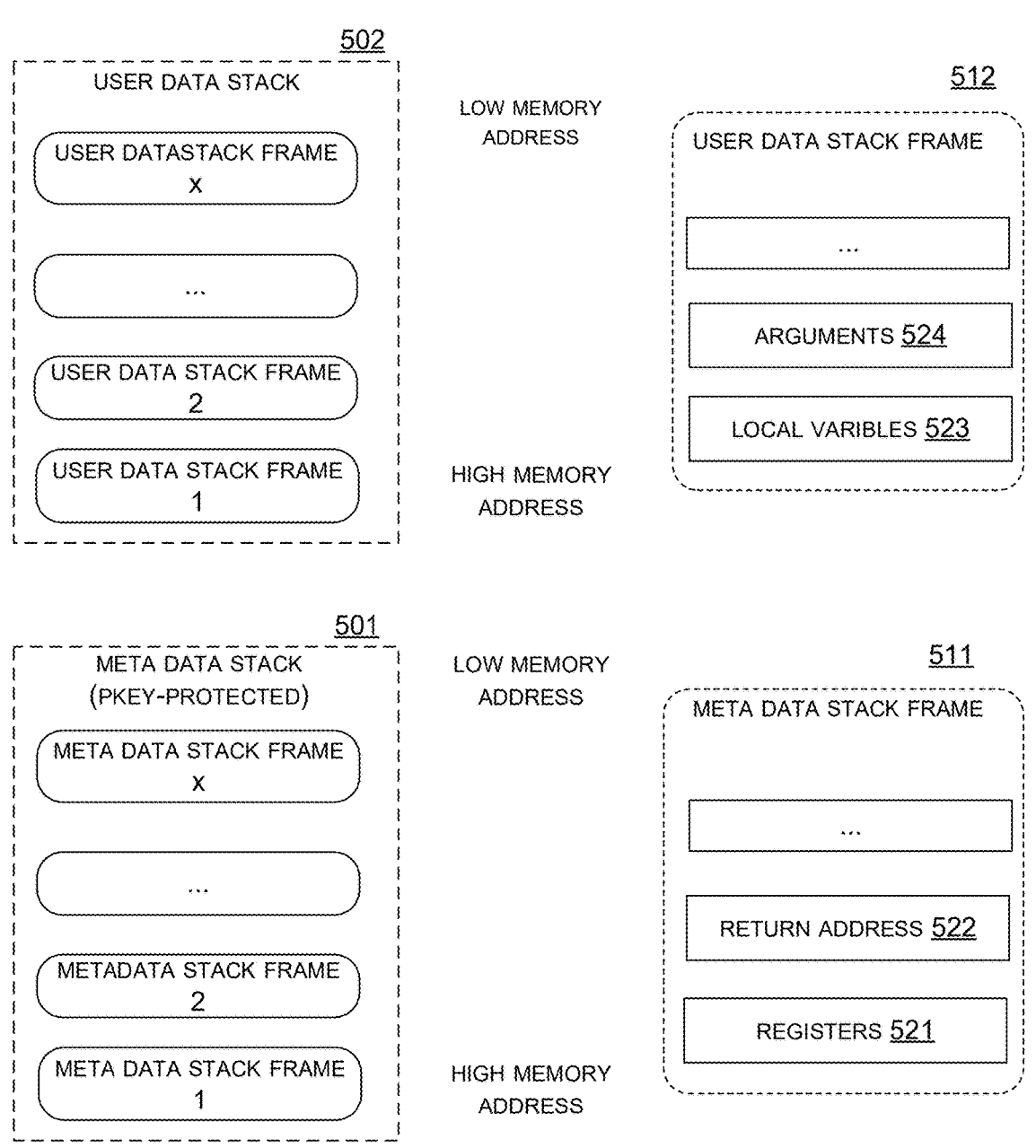
FIG. 5 depicts a stack configuration for function calls according to embodiments of the present disclosure.

With reference now to FIG. 4 and FIG. 5, embodiments of the present disclosure will be described. FIG. 4 depicts an overall process flow of a method 400 for executing a program in a computer according to embodiments of the present disclosure. FIG. 5 depicts a stack configuration for function calls according to embodiments of the present disclosure. As shown in FIG. 4, the method 400 generally comprises the following operations by one or more processing units: allocating a first memory page in a memory of the computer as a first stack to buffer meta data for function calls in the program (block 410); generating a memory protection key for the first memory page (block 420); and allocating a second memory page in the memory as a second stack to buffer user data for function calls in the program (block 430).

The method 400 may begin upon initiation of the program (e.g., main( ) FIG. 2). The program may be a program module 42 and executable on a computer system or server 12 as shown in FIG. 1. At block 410, a memory page (501, FIG. 5) is allocated in a memory of the computer, for example, in memory 28 as shown in FIG. 1. As is known, memory page 501 may be allocated by the operating system. A memory page is typically of a size of 4 KB, and the size may be configured. According to embodiments of the disclosure, the memory page is to be used as a stack to store meta data of functions as they are being invoked and executed in the computer. Hereinafter, the first memory page 501 can also be referred to as the first stack 501, meta data stack 501, and the terms may be used interchangeably in the context of different paragraphs of the description.

At block 420, a memory protection key is generated for the first memory page. As is known, Memory Protection Keys (PKEY) is a feature which is found on microprocessors (e.g., Intel's Skylake® (and later) "Scalable Processor" Server® CPUs). PKEY provides a mechanism for enforcing page-based protections. A PKEY-protected memory page cannot be accessed without the memory protection key associated with it. In one or more implementations, the memory protection key may be randomly generated. And the memory protection key may be stored in a secured library (e.g., in the storage system 34 of FIG. 1) accessible only to prologues and epilogue of invoked functions.

At block 430, a second memory page (502, FIG. 5) is allocated in the memory. According to embodiments of the disclosure, the second memory page is to be used as a stack to store user data of functions while they are being executed in the computer. Hereinafter, the second memory page 502 can also be referred to as the second stack 502, user data stack 502, and the terms may be used interchangeably in the context of different paragraphs of the description.

The operations above results in a stack configuration for function calls as shown in FIG. 5. FIG. 5 shows the meta data stack 501, which is the $1^{st}$ memory page allocated at block 410. The meta data stack 501 is protected by the memory protection key generated at block 420. FIG. 5 also shows the user data stack 502, which is the $2^{nd}$ memory page allocated at block 430.

To compare with call stack 310 as shown in FIG. 3, FIG. 5 also shows meta data stack frames 1, 2, . . . , and x within meta data stack 501, and user data stack frames 1, 2, . . . , and x within user data stack 502. They represent meta data stack frames and user data stack frames allocated to the functions $f1, f2, . . . ,$ and $fx$ (FIG. 2) as they are invoked in turn by their respective parents. For example, meta data stack frame 2 and user data stack frames 2 are a pair of stack frames allocated in response to a call to the function $f2$ by the function $f1$. Although both the meta data stack frame 2 and the user data stack frames 2 are associated with the same function $f2$, they are physically separated in the memory.

FIG. 5 also shows a meta data stack frame 511 to represent individual meta data stack frames like meta data stack frames 1, 2, . . . , and x, and a user data stack frame 512 to represent individual user data stack frames like user data stack frames 1, 2, . . . , and x.

The meta data stack frame 511 stores meta data of a function while it is being executed in response to a call from its parent. Among other things, the meta data comprises a registers segment 521 and a return address segment 522. The meaning of the registers segment 521 and the return address segment 522 is the same as that of the registers segment 321 and the return address segment 322 as discussed above with reference to FIG. 3.

The user data stack frame 512 stores user data of a function while it is being executed in response to a call from its parent. Among other things, the user data comprises a local variables segment 523 and an arguments segment 524. The meaning of the local variables segment 523 and the arguments segment 524 is the same as that of the local variables segment 323 and the arguments segment 324 as discussed above with reference to FIG. 3.

Figure 6:
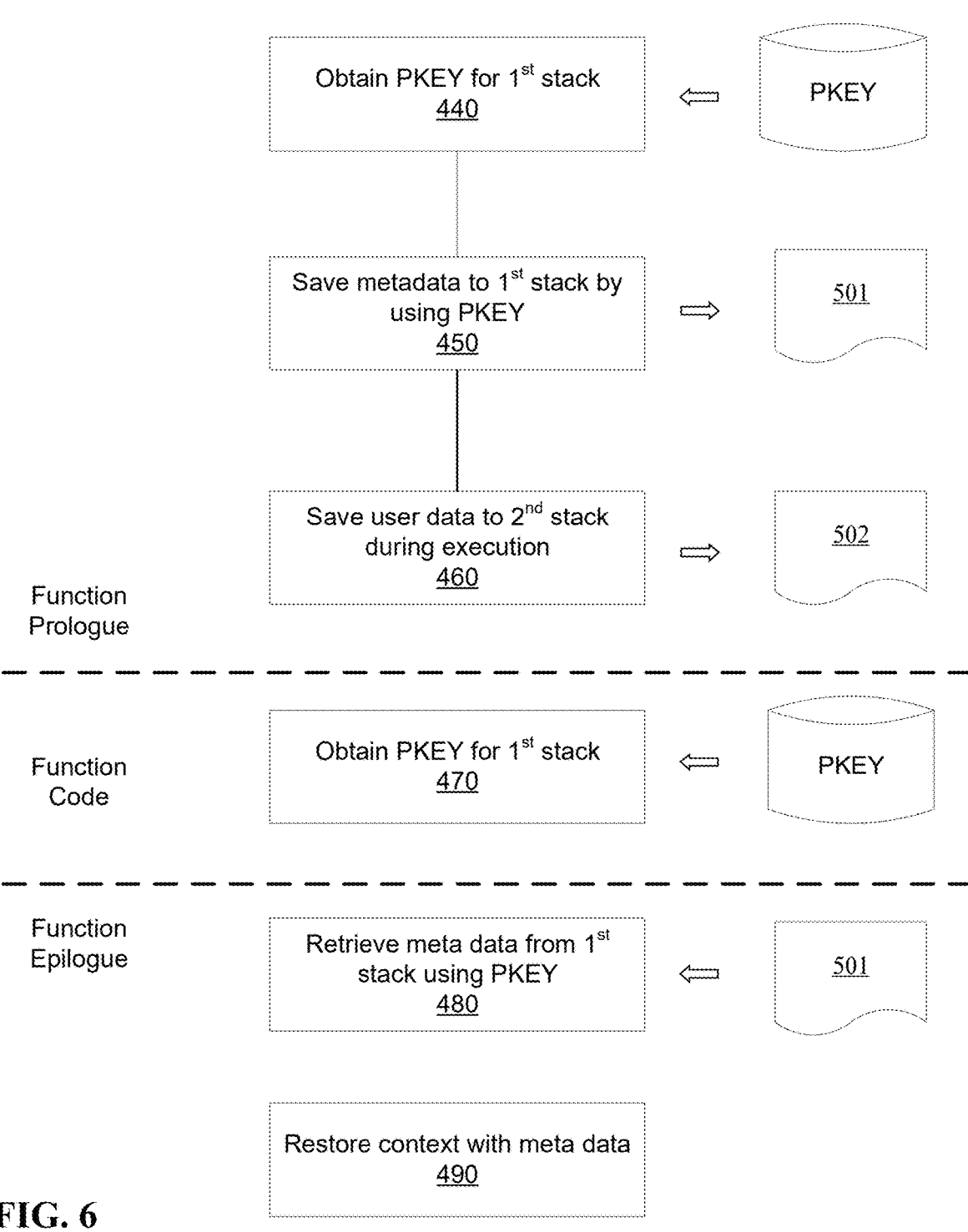
FIG. 6 depicts operations for executing a program in a computer according to embodiments of the present disclosure.

With reference to FIG. 6, operations for executing a program in a computer with respect to the meta data stack 501 and the user data stack 502 are depicted according to embodiments of the present disclosure. The operations in FIG. 6 as a whole constitute a continuation of the method 400 described in FIG. 4, which has allocated the $1^{st}$ stack 501 and the $2^{nd}$ stack 502, and generated the PKEY for protecting the $1^{st}$ stack 501. The operations may be performed by one or more processing units for any function call occurring during the running of the program, for example, main( ) for which the $1^{st}$ stack and the $2^{nd}$ stack 502 are allocated. As shown, the operations may comprise: in response to a function being invoked, obtaining, via an epilogue of the function, the memory protection key (block 440) and saving, via the prologue of the function, meta data of the function to a stack frame in the first stack by using the memory protection key, the meta data comprising context information of a caller invoking the function (block 450). The operations may comprise: storing user data of the function to a stack frame in the second stack, the user data being generated during the execution of the function (block 460). The operations may comprise: in response to the execution of the function being completed, obtaining, via an epilogue of the function, the memory protection key (block 470), retrieving, via the epilogue, the meta data of the function from the stack frame in the first stack by using the memory protection key (block 480) and restoring, via the epilogue, the context information for the caller with the meta data (block 490).

Specifically, assume the function $f1$ invokes the function $f2$, for example. In response, the prologue of the function $f2$ takes control of the entry of the function $f2$ into execution. At block 440, the prologue may obtain the memory protection key. The PKEY may be fetched from the secure library which stores the PKEY generated at block 410, as discussed above. With the PKEY, the prologue is enabled to access meta data stack 501, which is protected by the PKEY, as discussed above. Then, at block 450, the prologue may save meta data of the function $f2$ to meta data stack frame 2 in the meta data stack 501 by a stack PUSH operation, thanks to the PKEY. The meta data may comprise the registers 521 and the return address 522, etc., as discussed above.

Then the control is transferred to executable function codes of the function $f2$. During the execution of the function $f2$, the user data will be saved to user data stack frame 2 in the user data stack 502 by a stack PUSH operation, as indicate by block 460. The user data may comprise local variables 523 and arguments 524, etc., as discussed above. It is to be noted that, with respect to the user data, stack overflow may still occur, due to writing of intermediate data larger than pre-defined size as discussed above. However, the overflow can never infringe the meta data stack 501 because it is protected by the memory protection key.

The execution of the function $f2$ will be completed. Upon completion of the function $f2$, the control is transferred to epilogue of the function $f2$. At block 470, the prologue may obtain the PKEY from the secure library. With the obtained PKEY, at block 480, the epilogue may retrieve the meta data from meta data stack frame 2 by a stack POP operation. Finally, the epilogue may restore the context information for the caller function $f1$ with the meta data, such as the registers 521 and the return address 522, etc. As context restoration may be performed in conventional manner, detailed description is omitted here. Also, in the above description, it is not mentioned that, upon completion of the function $f2$, the arguments 524 of the function $f2$ will be passed to the function $f1$, because this is not much relevant and may be done in a relevant manner that is known to those skilled in the art. Therefore, omission of this and other details shall have no impact on understanding and implementing of the inventive idea of the disclosure.

After the function $f2$ exits from execution, meta data stack frame 2 and user data stack frame 2 will be released from the memory. As it may be done in conventional manner, detailed description in detail is omitted here.

Description of embodiments is thus concluded. It should be noted that the processing for protection of call stack in memory according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for executing a program in a computer, comprising:

allocating, by one or more processing units, a first memory page in a memory of the computer as a first stack to buffer function meta data for function calls of a function in the program;

generating, by the one or more processing units, a memory protection key for the first memory page; and allocating, by the one or more processing units, a second memory page in the memory as a second stack to buffer function user data for the function calls of the function in the program, wherein the function is configured to call at least one callee function of the function and the allocating the first stack buffers meta data for the callee function and the allocating the second stack buffers user data for the function calls of the callee function.

2. The method of claim 1, further comprising:

in response to the function being invoked, obtaining, by the one or more processing units, via a prologue of the function, the memory protection key; and saving, by the one or more processing units, via the prologue of the function, meta data of the function to a stack frame in the first stack by using the memory protection key, the meta data comprising context information of a caller invoking the function.

3. The method of claim 2, further comprising:

storing, by the one or more processing units, user data of the function to a stack frame in the second stack, the user data being generated during execution of the function.

4. The method of claim 3, further comprising:

in response to the execution of the function being completed:

obtaining, by the one or more processing units, via an epilogue of the function, the memory protection key;

retrieving, by the one or more processing units, via the epilogue, the meta data of the function from a stack frame in the first stack by using the memory protection key; and restoring, by the one or more processing units, via the epilogue, the context information for the caller with the meta data.

5. The method of claim 4, further comprising:

releasing, by the one or more processing units, the stack frame in the first stack and a second stack frame in the second stack from the memory upon exiting of the function.

6. The method of claim 1, wherein the first stack and the second stack are First-In Last Out stacks.

7. The method of claim 1, wherein the memory protection key is used for a second function of the program.

8. A system, comprising:

one or more processors; and one or more computer-readable storage media storing program instructions which, when executed by the one or more processors, are configured to cause the one or more processors to perform the following operations:

allocating a first memory page in a memory of a computer as a first stack to buffer function meta data for function calls of a function in the program;

generating a memory protection key for the first memory page; and allocating a second memory page in the memory as a second stack to buffer function user data for the function calls of the function in the program, wherein the function is configured to call at least one callee function of the function and the allocating the first stack buffers meta data for the callee function and the allocating the second stack buffers user data for the function calls of the callee function.

9. The system of claim 8, the program instructions being further configured to perform the following operations in response to the function being invoked:

obtaining, via a prologue of the function, the memory protection key; and saving, via the prologue of the function, meta data of the function to a stack frame in the first stack by using the memory protection key, the meta data comprising context information of a caller invoking the function.

10. The system of claim 9, the program instructions being further configured to perform the following operation:

storing, by one or more processing units, user data of the function to a stack frame in the second stack, the user data being generated during execution of the function.

11. The system of claim 10, the program instructions being further configured to perform the following operations in response to the execution of the function being completed:

obtaining, via an epilogue of the function, the memory protection key;

retrieving, via the epilogue, the meta data of the function from a stack frame in the first stack by using the memory protection key; and restoring, via the epilogue, the context information for the caller with the meta data.

12. The system of claim 10, the program instructions being further configured to perform the following operation:

releasing, via an epilogue of the function, the stack frame in the first stack and a second stack frame in the second stack from the memory upon exiting of the function.

13. The system of claim 8, wherein the first stack and second stack are First-In Last Out stacks.

14. A computer program product comprising a computer readable storage medium having program instructions embodied therewith, the program instructions executable by processing means, so as to cause the processing means to perform the following operations:

allocating a first memory page in a memory of the computer as a first stack to buffer function meta data for a first execution of function calls of a function in the program;

generating a memory protection key for the first memory page; and allocating a second memory page in the memory as a second stack to buffer function user data for the first execution of the function calls of the function in the program.

15. The computer program product of claim 14, the program instructions being further configured to cause the processing means perform the following operations in response to the function being invoked:

obtaining, via a prologue of the function, the memory protection key; and saving, via the prologue of the function, meta data of the function to a stack frame in the first stack by using the memory protection key, the meta data comprising context information of a caller invoking the function.

16. The computer program product of claim 15, the program instructions being further configured to cause the processing means perform the following operation:

storing, by one or more processing units, user data of the function to a stack frame in the second stack, the user data being generated during execution of the function.

17. The computer program product of claim 16, the program instructions being further configured to cause the processing means perform the following operations in response to the execution of the function being completed:

obtaining, via an epilogue of the function, the memory protection key;

retrieving, via the epilogue, the meta data of the function from a stack frame in the first stack by using the memory protection key; and restoring, via the epilogue, the context information for the caller with the meta data.

18. The computer program product of claim 16, further configured to cause the processing means perform the following operation:

releasing, via an epilogue of the function, the stack frame in the first stack and a second stack frame in the second stack from the memory upon exiting of the function.

19. The computer program product of claim 14, wherein the first stack and second stack are First-In Last Out stacks.

* * * * *